(No Model.)

A. CHAPMAN.
LEAD TRAP OR CESSPOOL.

No. 269,177.　　　　　　　　　Patented Dec. 19, 1882.

Witnesses:　　　　　　　　　　Inventor,
　　　　　　　　　　　　　　　Alexander Chapman,
　　　　　　　　　　　　　Per:
　　　　　　　　　　　　　　　　　Atty.

UNITED STATES PATENT OFFICE.

ALEXANDER CHAPMAN, OF MONTREAL, QUEBEC, CANADA.

LEAD TRAP OR CESSPOOL.

SPECIFICATION forming part of Letters Patent No. 269,177, dated December 19, 1882.

Application filed August 9, 1882. (No model.)

*To all whom it may concern:*

Be it known that I, ALEXANDER CHAPMAN, of the city of Montreal, in the district of Montreal and Province of Quebec, Canada, have invented certain new and useful Improvements in Lead Traps or Cesspools; and I do hereby declare that the following is a full, clear, and exact description of the same.

My invention relates to improvements in that class of traps which are formed of lead and used for sinks, water-closets, &c., and has for its object to provide a trap which will be easily and cheaply made and of the required strength at each part, one which will require no solder, the parts, however, being fitted together with nicety and perfection, and which will have the least possible space between the descending and ascending pipes, thus lessening friction and liability to "chock" by permitting a rapid discharge.

Many other advantages in my construction of trap will be apparent to those skilled in the art.

For complete comprehension of my invention reference must be had to the accompanying drawings, where letters similar to those used in this specification indicate like parts, and in which—

Figure 1:
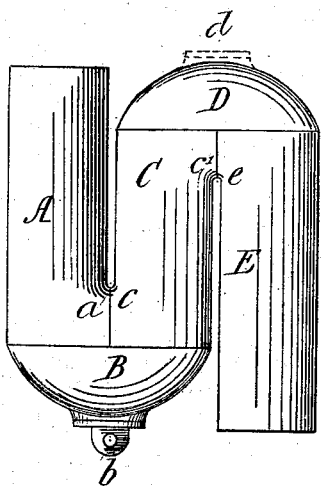
Figure 2:
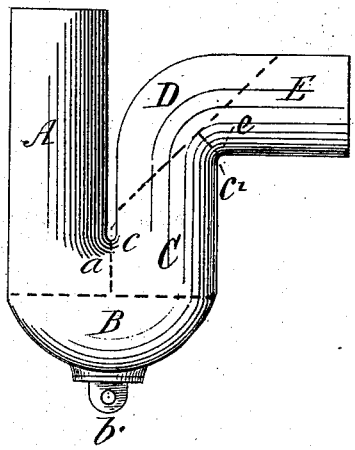

Figure 1 is a side view representing the different parts of my trap in position before the joints are closed; Fig. 2, a view of trap completed; and Fig. 3, a section of part of trap, showing internal lagging used in closing joints.

A represents the descending inlet-pipe; B, the heel, and *b* any suitable brass plug in same; C, the ascending intermediate pipe; D, the upper bend-piece, and E the outlet or discharge pipe, arranged at any angle, as may be required.

The pipes A, C, and E are preferably of plain lead pipe, the curved portions *a*, *c*, *c'*, and *e* being formed by slitting the side of each pipe, and then turning out the substance by means of a die or former. The joining edges are then trued off with a knife in any desired way. The heel B is stamped preferably out of sheet-lead and the aperture for the plug *b* formed at the same time, and the cap D for the upper bend formed in the same manner, and provided, if desired, with a ventilating-cap, (shown at *d* in dotted lines.) The different joints, having been properly trued and fitted, are then joined by burning, preferably by means of the ordinary hydrogen blow-pipe, which will join lead to lead upon a metallic or non-combustible lagging, so that the inside bore may be smooth, true, and uniform throughout, and the outside surfaces can then be smoothed off to make a neat and perfect job.

Fig. 2 shows a complete trap constructed according to my invention, the outlet-pipe E being, however, shown at right angles to the intermediate pipe, C, which demonstrates (by observing the dotted lines) that different styles of trap may be made in sections put together in accordance with my invention without departing from the spirit or main features thereof.

Figure 3:
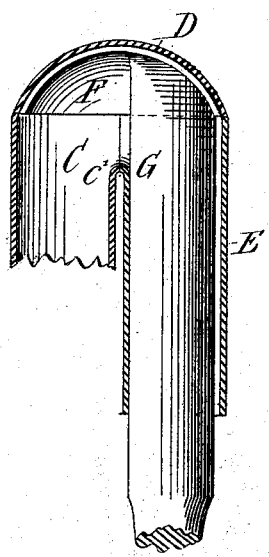

In Fig. 3, F represents the lagging or core, made in two halves and kept in place by plugs G. When the burning of the joints is completed these plugs are withdrawn and the lagging falls out through the pipes.

I do not limit myself to the use of drawn lead pipe, as the different parts may be cast and fitted together with equal facility. It will be seen that by my invention, first, a trap can be formed with the necks very close together— that is to say, with the least possible space between the descending and ascending pipes— (a close joint at the same time being insured,) and thus greatly reduce the friction and resistance to the movement of the water-stand; secondly, the heel can be made of any strength, either by stamping or casting it thicker at its lower part, and thus do away with the necessity experienced at present of putting solder on that part; and, thirdly, the intermediate pipe may be made of any length, so as to give any desired depth of water-stand, without in any way altering the other parts of the trap, thus effecting saving in many ways understood by plumbers.

I am aware that traps have been cast all in one piece, with merely a partition between the inlet, intermediate, and outlet pipes, and also that traps have been formed in halves by both drawing and casting, and afterward soldered throughout their entire length. I am also aware of the patent to Thompson, No. 128,263, June 25, 1872, in which traps are made in sections, fitting the one within the other at their ends, and afterward soldered, forming joints transversely of the trap within the bent portion of it. I am also aware that the principle of burning joints in lead-work is not new, and do not therefore claim same, nor any of the methods or constructions just alluded to.

What I claim, and desire to secure by Letters Patent, is—

A lead trap made up of separate inlet, intermediate, and discharge pipes, and separate caps covering the bends, their meeting edges being joined together edge to edge without overlapping, and joined lead to lead without solder, substantially in the manner and for the purpose set forth.

ALEXANDER CHAPMAN.

Witnesses:
C. R. McDOWELL,
R. A. KELLOND.